US009586372B2

(12) United States Patent
Guadagnin

(10) Patent No.: US 9,586,372 B2
(45) Date of Patent: Mar. 7, 2017

(54) METHOD FOR MANUFACTURING POLARISED LENSES FOR SPECTACLES AND LENSES PRODUCED USING THAT METHOD

(71) Applicant: SAFILO SOCIETÀ AZIONARIA FABBRICA ITALIANA LAVORAZIONE OCCHIALI S.P.A., Pieve di Cadore (IT)

(72) Inventor: Paolo Guadagnin, Padua (IT)

(73) Assignee: SAFILO Società Azionaria Fabbrica Italiana Lavorazione Occhiali S.P.A., Pieve di Cadore (BL) (IT)

( * ) Notice: Subject to any disclaimer, the term of this patent is extended or adjusted under 35 U.S.C. 154(b) by 0 days.

(21) Appl. No.: 14/907,749

(22) PCT Filed: Jul. 10, 2014

(86) PCT No.: PCT/EP2014/064858
§ 371 (c)(1),
(2) Date: Jan. 26, 2016

(87) PCT Pub. No.: WO2015/010918
PCT Pub. Date: Jan. 29, 2015

(65) Prior Publication Data
US 2016/0185055 A1 Jun. 30, 2016

(30) Foreign Application Priority Data
Jul. 26, 2013 (IT) .............................. PD2013A0209

(51) Int. Cl.
G02C 7/12 (2006.01)
G02C 7/02 (2006.01)
(Continued)

(52) U.S. Cl.
CPC .. *B29D 11/00009* (2013.01); *B29C 45/14836* (2013.01); *B29C 51/10* (2013.01);
(Continued)

(58) Field of Classification Search
CPC .......... B29D 11/0048; B29D 11/00009; B29D 11/00644; B29D 11/0073; G02C 7/12;
(Continued)

(56) References Cited

U.S. PATENT DOCUMENTS 4,873,029 A * 10/1989 Blum ..................... B29D 11/00
264/1.32
2015/0158259 A1* 6/2015 Yamamoto ............... G02C 7/12
264/1.32

FOREIGN PATENT DOCUMENTS

EP 2 130 667 A1 12/2009
EP 2 302 444 A1 3/2011
WO 01/91994 A1 12/2001

* cited by examiner

Primary Examiner — Tuyen Tra
(74) Attorney, Agent, or Firm — Volpe and Koenig, P.C.

(57) ABSTRACT

A method of manufacturing a polarizing lens for spectacles in which the lens is obtained by injection co-molding the material of the lens on a polarizing optical filter structure is described. The optical filter structure which already has its curved shape received during the stage of filter manufacture is subjected to a thermoforming stage before being inserted into the injection mold in order that the optical filter should obtain the desired curvature for the subsequent stage of injection co-molding the lens onto the optical filter structure.

13 Claims, 1 Drawing Sheet

(51) Int. Cl.
*B29D 11/00* (2006.01)
*B29C 45/14* (2006.01)
*B29C 51/10* (2006.01)
*B29C 51/26* (2006.01)
*B29C 69/02* (2006.01)
*G02B 1/04* (2006.01)
*B29K 77/00* (2006.01)
*B29K 105/00* (2006.01)

(52) U.S. Cl.
CPC ............ *B29C 51/266* (2013.01); *B29C 69/02* (2013.01); *B29D 11/0073* (2013.01); *B29D 11/00644* (2013.01); *G02B 1/041* (2013.01); *G02C 7/12* (2013.01); *B29C 2045/14868* (2013.01); *B29K 2077/00* (2013.01); *B29K 2105/0058* (2013.01); *B29K 2105/253* (2013.01)

(58) Field of Classification Search
CPC . B29C 45/14836; B29C 51/10; B29C 51/266; B29C 69/02; B29C 2045/14868; G02B 1/041
USPC ........ 351/159.49, 159.56, 49, 900; 264/1.32, 264/1.7, 2.2, 2.7
See application file for complete search history.

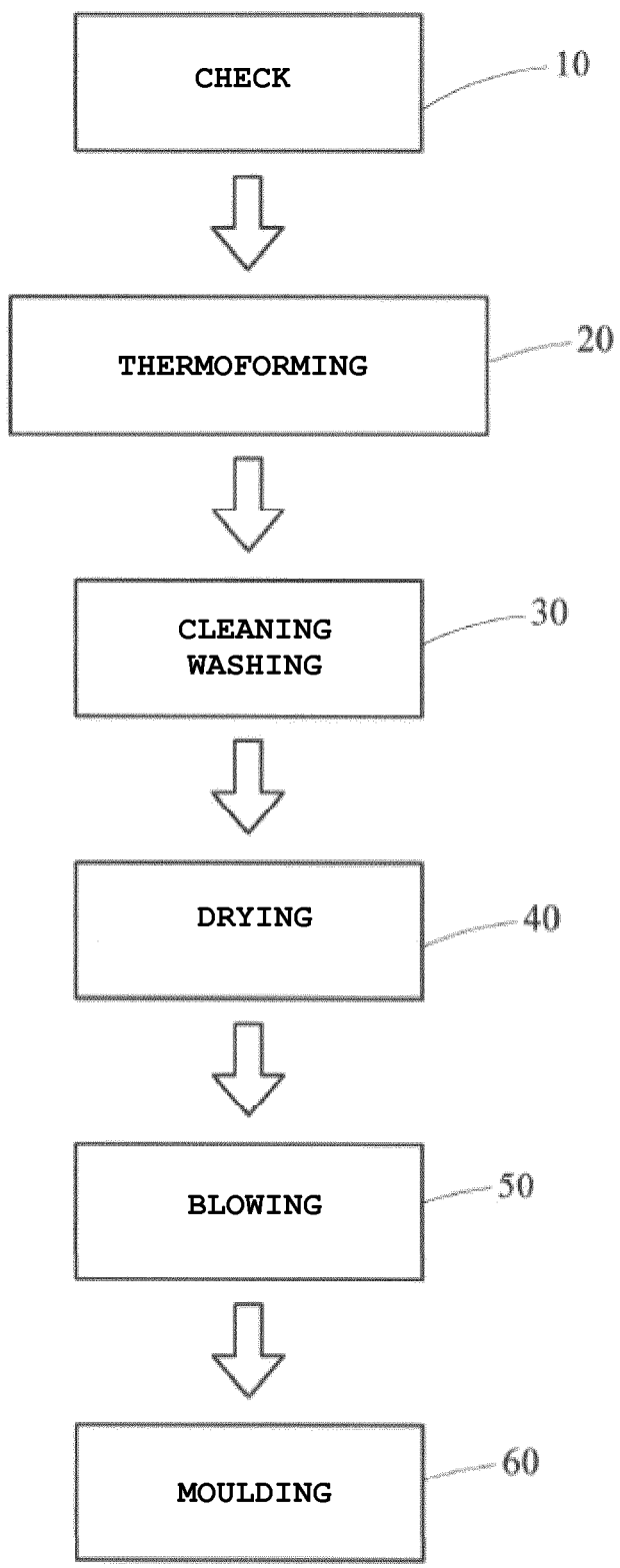

METHOD FOR MANUFACTURING POLARISED LENSES FOR SPECTACLES AND LENSES PRODUCED USING THAT METHOD

CROSS REFERENCE TO RELATED APPLICATIONS

This application is a 35 USC §371 national stage application of International Patent Application No. PCT/EP2014/064858, which was filed Jul. 10, 2014 and claims priority to Italian Patent Application No. PD2013A000209, which was filed Jul. 26, 2013, both of which are incorporated herein by reference as if fully set forth.

TECHNICAL FIELD

This invention relates to a method of manufacturing polarised lenses for spectacles having the characteristics stated in the precharacterising clause of principal claim no. 1.

The invention also relates to polarised lenses manufactured using the abovementioned method of manufacture.

TECHNICAL BACKGROUND

The invention lies within the technical scope of the production of lenses for spectacles through the technology of injection moulding lenses onto polarising optical filters.

Polarising lenses are widely used by opticians because of their functional advantages and the benefits which they confer. Lenses with a polarising filter in fact filter out some electromagnetic radiation, allowing only rays originating from direct sources to pass, neutralising reflected light, and in particular blocking out horizontal light rays, that is those which are likely to cause dazzle. Polarising filters also attenuate UV-A and UV-B radiation. Spectacles with polarising lenses neutralising reflected light and the dazzling effect of reflection therefore provide clear relaxed vision, bringing about visual well-being and improving visual performance, as well as also allowing colours and contrasts to be better perceived.

A known method for manufacturing polarising lenses provides for the preparation of an optical filter structure, also known in the pertinent technical field by the term "wafer", on which a lens structure is co-moulded through injection moulding in a suitable mould.

A difficult stage in the abovementioned process is that relating to preparation of the wafer before insertion in the mould, a stage which requires a dimensional and quality check, the possible removal of protective films and cleaning of the surfaces of the filter, the degree of cleaning having a substantial influence on the final quality that can be achieved through injection co-moulding of the lens.

In the context of conventional processes for the manufacture of polarising wafers it is found that these processes do not always provide an optimum shape of optical filter as regards use for the subsequent production of polarising lenses.

In fact because of limits with the materials constituting the wafer and/or limits on the methods of manufacturing/shaping of the wafer, it can happen that they have a curvature which is not precisely spherical. For example a recurrent defect is that of a "toric" shape, in which the optical filter has two different radii of curvature corresponding to the two main axes (longitudinal and transverse), instead of having a constant radius along all axes.

A defect in the shape of the wafer, even if minor, can give rise to defects or even "rejects" in the polarised lenses produced from them.

In fact, on the assumption that it is desired to manufacture a lens having a spherical surface, if the wafer does not in itself have a perfectly spherical surface it is unable to make a perfect "match" with the cavity in the mould for injection of the lens. The wafer must therefore be to some extent forced into the cavity of the mould to ensure that its outer surface is in as close contact as possible with the surface of the cavity.

Two alternative disadvantages may typically arise in this situation:

a) the wafer may break during the co-injection process as a result of the injection process conditions on the material of the deformed wafer, which experiences tension in this way;

b) if the wafer does not break, it may happen that once the lens has been obtained the insides of the wafer will "remember" its original shape, and will tend to recover it to some extent, causing deformation of the polarising lens.

DESCRIPTION OF THE INVENTION

The problem underlying this invention is that of providing a method for the manufacture of a polarised lens designed to overcome the disadvantages mentioned with reference to the cited known art in order to improve the stage of preparing the structure of the polarised filter before the stage of injection moulding of the lens in order to help obtain suitable levels of quality in the final structure of the lens.

This problem is resolved by the invention through a method of manufacturing polarised lenses for spectacles carried out in accordance with the appended claims.

BRIEF DESCRIPTION OF THE DRAWINGS

The characteristics and advantages of the invention will be more apparent from the following detailed description of a preferred embodiment illustrated by way of indication and without limitation with reference to the appended FIGURE which shows a flow diagram with the main operating stages in the method of manufacture according to the invention.

PREFERRED EMBODIMENTS OF THE INVENTION

With reference to the FIGURE mentioned, a lens for spectacles with a polarising filter, not shown, is obtained by the method of manufacture according to the invention, the main stages of which are illustrated diagrammatically in the flow diagram shown.

The lens is designed as a polarised lens, the lens structure of which is manufactured by co-moulding the material of the lens, preferably a polyamide, on a polarised optical filter designed to impart the polarising effect to the lens.

The polarised optical filter conveniently has a layered configuration, with an effectively polarised layer protected by protective layers placed thereupon, conveniently made of polyamide. An optical filter of this type is for example described in EP 2009154327.

Because of its layered configuration, the optical filter is also known in the pertinent technical field by the term "wafer".

During a first stage of the method, identified by 10, the optical filter which has already previously been made using a specific procedure which is not the object of this invention and which is capable of providing it with polarising properties undergoes a sequence of dimensional checks, for example using gauges or similar devices, and quality checks.

Once these checks have been made the optical filter undergoes a thermoforming process according to a main stage in the method according to the invention, indicated by 20 in the attached diagram.

In this stage the optical filter is inserted into a thermoforming mould, in which it is positioned in such a way that its contact surface with the mould is that which will be the outer convex surface of the filter. The surface of the mould is constructed with the desired curvature for the optical filter (for example a spherical shape). After the optical filter has been positioned in the mould, the mould is heated and as a result of vacuum created opposite the contact surface with the mould the optical filter adheres to the mould, copying its shape and adopting its curvature. Once cooled, the optical filter which has been thermoformed in this way is removed from the mould and passed on to the subsequent stages in the method. It will be noted that the method in the invention therefore provides for subjecting the optical filter to a stage of thermoforming, regardless of the method of bending previously used by the optical filter manufacturer (where for example it has been obtained by thermoforming from a sheet or strip of thermoplastics material).

After thermoforming stage 20 the optical filter may undergo removal of any protective films fitted during the stage of producing the wafer for the purpose of protection during subsequent stages of processing. In a subsequent stage, indicated as a whole by 30, provision is made for cleaning the wafer by washing. This phase meets several requirements in the process for production and forming of the optical filter. Essentially, the process of forming the optical filter provides a rather dry wafer structure, due largely to the presence of polyamide, a typically hygroscopic material. It is also necessary to remove any residues of adhesive from the protective films during this stage.

The cleaning and washing stage, indicated as a whole by 30, may conveniently be subdivided into a series of substages, described in detail below.

The cleaning stage comprises a stage 30a of ultrasound washing through immersing the optical filter in an aqueous solution with an alkaline soap, at a pH of preferably 13.4, at a temperature of approximately 50° C., for a time of approximately 5 minutes.

Stage 30a is followed by a stage 30b of rinsing in water, through shaking a basket carrying the filter in the solution for approximately 30 seconds at ambient temperature.

Stage 30b is followed by a stage 30c which comprises a second ultrasound wash through immersing the optical filter in an aqueous solution with slightly acid soap, preferably having a pH of 5.

Stage 30c is followed by a subsequent stage 30d of rinsing in water through immersing the optical filter at ambient temperature for approximately 30 seconds.

Stage 30d is followed by a subsequent stage 30e of rinsing in demineralised water for approximately 4 minutes at a temperature of approximately 50° C.

Cleaning/washing stage 30 is followed by a stage 40 of drying in a static oven at 55° C. with a residence time of some 10 minutes during which the optical filters are placed on a holding support.

After drying stage 40 there follows a stage 50 of blowing the optical filter with ionised air.

Once the drying/blowing stages are complete, the optical filter is prepared for a subsequent stage 60 of moulding the lens. The optical filter wafer is first of all placed in the mould, for example using suitable automatic tools or robots.

Then once the mould has been closed the polyamide material (nylon) is injected so that it is co-moulded onto the wafer structure. After the injection stage is complete the co-moulded lens is removed from the mould, conveniently through the help of automatic tools or robots and undergoes a set of visual/qualitative checks.

Its colour is checked, for example by means of a spectrophotometer, and a check is also made on its optical properties, for example using a lensmeter. Typically, the abovementioned checks are carried out on a sample. Subsequently, where specified, anti-scratching treatment is applied to the lens, or mirroring and/or anti-reflective treatment, which are in themselves substantially conventional.

Visual/aesthetic checks according to regulated specifications or standards are subsequently provided before the final stage of packaging and dispatch.

The invention thus overcomes the problem stated, achieving the objects previously set out and conferring the advantages listed in relation to known solutions.

One main advantage lies in the fact that thanks to the provision of a preliminary thermoforming stage as a result of which the wafer of the optical filter is again subjected to a forming operation in order to obtain the desired curvature, defects in the optical filters which leave the production stage with undesirable curvature are substantially eliminated, thus eliminating one of the main causes of "rejects" in polarised lenses produced from filter incorporating such defects.

Thanks to the method according to the invention it is therefore advantageously possible to dispense with the method of bending the optical filter wafer used by the filter manufacturer/supplier to ensure that the wafer of the optical filter fulfils the geometrical requirements necessary in the subsequent stages of production of the polarising lens.

The invention claimed is:

1. A method of manufacturing a polarized lens for spectacles, wherein the lens is produced by co-injection moulding of the lens on to a polarizing optical filter structure, wherein the optical filter structure, which already has a curved shape imparted to it during the production of the filter, is subjected, before insertion into the injection mould, to a step of thermoforming for the purpose of providing the desired curvature in the optical filter for the subsequent step of co-injection moulding of the lens on to the optical filter structure.

2. A method according to claim 1, wherein in the thermoforming step, the optical filter is positioned in a thermoforming mould with the convex surface of the filter bearing on the mould surface which is made with the desired curvature, the application of a vacuum between these surfaces during the thermoforming step enabling the filter to assume the curvature defined by the mould and to retain the curvature when the filter has been cooled and removed from the thermoforming mould.

3. A method according to claim 1, wherein after the thermoforming step, provision is made for a step of cleaning the optical filter structure, the cleaning step comprising a step of ultrasonic washing by immersion of the optical filter in an aqueous solution with alkaline soap.

4. A method according to claim 3, wherein the washing solution is prepared with a pH value of 13.4 and a temperature of about 50° C., and provision is made for the optical filter to be kept immersed for about 5 minutes.

5. A method according to claim 4, wherein the ultrasonic washing step is made to be followed by a first rinsing of the optical filter in water by oscillation of a filter carrying basket in the aqueous solution for about 30 seconds at ambient temperature.

6. A method according to claim 5, wherein provision is made for a second ultrasonic wash by immersion of the optical filter in an aqueous solution with slightly acid soap, preferably with a pH value of 5.

7. A method according to claim 6, wherein the second washing step is made to be followed by a further step of rinsing in water by immersion of the optical filter for about 30 seconds at ambient temperature.

8. A method according to claim 7, wherein provision is made for a further step of rinsing in demineralized water for about four minutes at a temperature of about 50° C.

9. A method according to claim 8, wherein the washing and rinsing steps are followed by a step of drying the optical filter in a conventional oven at 55° C. for a period of about 10 minutes.

10. A method according to claim 9, wherein the drying step is followed by a step of blowing the optical filter with ionized air.

11. A method according to claim 1, wherein the optical filter is made with a layered structure including a true optical layer and at least one protective polyamide layer for protecting the true optical layer.

12. A method according to claim 1, wherein the portion of the lens structure co-moulded on to the optical filter is made of polyamide.

13. A polarized lens for spectacles made according to the method of claim 1.

* * * * *